United States Patent Office 2,919,292
Patented Dec. 29, 1959

2,919,292

PROCESS FOR THE PRODUCTION OF OXYGENATED COMPOUNDS

Philip C. Johnson and Norman R. Cox, St. Albans, W. Va., assignors to Union Carbide Corporation, a corporation of New York No Drawing. Application July 22, 1958
Serial No. 750,084

3 Claims. (Cl. 260—604)

This invention relates to the preparation of oxygen-containing organic compounds by the reaction of carbon monoxide and hydrogen with olefinic compounds containing at least one carbon to carbon double bond in the presence of a cobalt-containing catalyst source. In one aspect this invention relates to a method of injecting an oil-insoluble cobalt salt dissolved in methanol to produce finely divided cobalt salt particles suspended in the olefin feed in a hydroformylation zone.

This application is a continuation-in-part of copending application Serial No. 624,483 entitled "Process for the Production of Oxygenated Compounds," by P. C. Johnson and N. R. Cox, filed November 27, 1956 and now abandoned, and assigned to the same assignee as the instant application.

With reference to the Oxo process, there have been several proposals in the past as to the method of adding the potential catalyst or catalyst per se to the hydroformylation zone in the production of oxygenated compounds such as aldehydes and alcohols. One method is the addition of a soluble cobalt salt in the olefin feed stream. These compounds include the cobalt salts of the fatty acids such as stearic, palmitic, oleic, or higher acids of natural or synthetic origin. Though this method is alleged to decrease the induction period in the Oxo reaction, serious drawbacks are manifested. Cobalt salts of the higher fatty acids suffer from the disadvantage that they have a low weight percentage of cobalt per molecule weight, and hence, higher weight concentrations are necessary to produce the optimum concentration of the active cobalt carbonyl and/or hydrocarbonyl catalyst as compared with the use of the lower fatty acid cobalt salts. Furthermore, cobalt salts of the higher fatty acids are relatively expensive. In addition, a further disadvantage is the introduction of a high molecular weight organic anion to the system when employing the higher fatty acids cobalt salts.

Another method involves the addition of an oil-insoluble, water-soluble cobalt salt as an aqueous solution or emulsion to the reaction zone. In one case a cobalt acetate solution in water is buffered in the pH range from 6 to 7. In another case, an emulsifying agent, in very narrow limits of concentration, i.e., 0.15 to 2.0 weight percent based on the olefin, is added to the aqueous cobalt salt solution.

In a still further case the cobalt salt is introduced into the reactor suspended in an emulsion (with or without an emulsifying agent) or an immiscible organic liquid and water. The disadvantages encountered include, among others, a relatively long induction period and the fact that the presence of water in the reaction zone results in severe corrosion of the equipment. Another disadvantage when higher olefins are used is that two phases may be present in the reaction zone if the amount of water added is not closely controlled. This condition leads to an unstable hydroformylation reaction because the cobalt salt solution in the aqueous layer, is not readily available for conversion to the active hydroformylation catalyst.

It has also been proposed to add the cobalt salt as a slurry into the hydroformylation zone. Addition of the potential catalyst as a suspension is, perhaps, the most common method of introduction. Normally, the potential cobalt catalyst, either in the form of an organic salt or oxide, is added to the olefin feed stream as a suspended slurry or dispersion. Alternatively, the potential catalyst is slurried in an anhydrous medium which is soluble in the olefin feed, and the mixture is added to the reaction zone. One of the disadvantages of this procedure for introducing the catalyst is that a slurry of cobalt acetate in, for example, nonenes is difficult to handle. The nonenes are of low density and low viscosity so that maintenance of a uniformly dispersed slurry in the feed tanks is difficult. Another disadvantage of this procedure is that water, almost always present in small quantities in tanks, conduits, or other parts of the operating equipment is practically insoluble in the higher olefins. The presence of water produces a mixture which forms gummy deposits when in contact with cobalt acetate. These deposits tend to clog check valves and cause erosion of the check valve seats and gaskets. Such difficulties require frequent and expensive maintenance of the operating equipment. Moreover, in a continuous operation to produce aldehydes from olefins by the use of a slurried cobalt salt considerable difficulty is encountered in pumping the slurried salt in sufficient quantity at a uniform rate to provide adequate concentration of potential catalyst at full rated olefin flow.

The prior art also teaches dissolving an oil-soluble cobalt salt such as cobalt naphthenate in a saturated hydrocarbon solvent such as benzene. Excessive quantities of cobalt salt and solvent are employed which, in itself, constitutes a serious economic disadvantage. The added steps of extracting the unsaturated aldehydes further complicates the recovery operation.

The rate of the hydroformylation reaction is governed principally by the amount of cobalt carbonyl and/or hydrocarbonyl present. The catalyst can be prepared in situ by reaction of the cobalt metal, salt, or oxide with the synthesis gas to form the active cobalt hydroformylation catalyst. Alternatively, the prior art also teaches the preparation of the active catalyst prior to the hydroformylation reaction. The technique involves precipitation of cobalt carbonate in the presence of kieselguhr, washing the precipitate with water, drying, granulating, and subsequently packing a steel reactor with the powdered material. The cobalt carbonate is reduced to the metal with hydrogen at elevated temperatures. Xylene and carbon monoxide, at elevated pressures, are then passed over the metallic cobalt thereby converting the cobalt metal to cobalt carbonyl dissolved in the xylene medium. This method suffers from the fact that the rate of formation of cobalt carbonyl is not constant, and consequently, there is little control as to the amount of active catalyst added to the hydroformylation zone. Furthermore, handling a solution of xylene containing the volatile and toxic cobalt carbonyl is difficult.

Accordingly, one or more of the following objects will be achieved by the practice of our invention.

It is an object of this invention to provide a novel process for producing oxygenated organic compounds by the reaction of carbon monoxide and hydrogen with olefinic compounds containing at least one carbon to carbon double bond in the presence of a cobalt-containing catalyst source described hereinafter. It is also an object of this invention to provide a novel process for injecting, as the sole catalyst source, a water-soluble, oil-insoluble cobalt salt dissolved in methanol to produce finely divided cobalt salt particles suspended in the olefin feed in a hydroformylation zone. Another object of this invention is to provide a novel process for injecting into a hydroformylation zone a water-soluble, oil-insoluble, cobalt salt described hereinafter, said cobalt salt being dissolved in methanol, thereby producing in situ said cobalt salt finely dispersed in the olefin feed. A still further object of this invention is to provide a hydroformylation process wherein the reaction rate index is substantially decreased.

These and other objects will become apparent to those skilled in the art in the light of the instant specification.

In accordance with our invention we have discovered that cobalt acetate or cobalt propionate dissolved in methanol when injected into a hydroformylation reaction zone into contact with an olefin feed stream results in the precipitation of said cobalt salt in very finely dispersed form in the reaction medium. The methanol solution of the cobalt salt upon contact with the olefin feed results in methanol dissolving in the olefin feed and/or reaction medium while throwing out the oil-insoluble cobalt salt as a suspension in the olefin. We have discovered that the cobalt salt particles produced by our method are of size not obtainable with conventional cobalt salt slurries. Suprisingly, indeed, our process produces an average salt particle approaching colloidal dimensions. It is manifest that such a finely divided suspension of potential catalyst represents one of the most favorable conditions for active catalyst formation, i.e., cobalt carbonyl and/or hydrocarbonyl, due to the large surface area of the potential catalyst. A cobalt salt slurried prior to injection in the reaction zone is necessarily limited to the particle size of the cobalt salt which is admixed with the liquid medium to form the slurry.

Several advantages are realized by the practice of our invention. Cobalt acetate and cobalt propionate are less expensive than the olefin-soluble cobalt salts of the naphthenic acids or the higher fatty acids such as oleic, stearic, and palmitic, nor are high molecular weight complex organic anions introduced into the hydroformylation zone by the use of our cobalt salts as compared with the higher fatty acid or naphthenic acid cobalt salts. In addition, a greater quantity by weight of cobalt is made available as a potential catalyst source when employing cobalt acetate or cobalt propionate than can be realized when employing an equal weight of, for example, cobalt stearate or cobalt naphthenate. Moreover, in a continuous operation a solution of cobalt acetate or cobalt propionate dissolved in methanol, is easier to pump into the hydroformylation zone at a uniform rate to provide adequate concentration of potential catalyst at full rated olefin flow than is the case of a cobalt salt slurry. Moreover, any residual water in the feed lines or pumps will dissolve or solubilize in the methanol vehicle whereas a slurried cobalt salt such as cobalt acetate slurried in olefin will produce gummy deposits in the equipment upon contacting the residual water. A significant advantage of our process is the formation in the hydroformylation zone of cobalt salt particles approaching colloidal dimensions in particle size. Thus, an extremely large surface area of the very finely divided cobalt salt particles is available as the potential catalyst source. This benefit of increased surface area is achieved without the necessity of grinding, pulverizing, milling, etc., the solid cobalt salt prior to injection into the reaction zone. As will be shown hereinafter, our injection method wherein the cobalt salt is dissolved in the methanol medium results in a faster reaction rate index than is the case with the same cobalt salt injected as a slurry into the hydroformylation zone. By the term reaction rate index as used hereinafter is meant the time that is required for the pressure within the hydroformylation zone containing carbon monoxide, hydrogen, potential catalyst, and olefinic feed to drop from a predetermined pressure, e.g. 300 p.s.i.g., to a pressure wherein substantial active carbonyl catalyst is formed, e.g., 200 p.s.i.g.; thus, the reaction rate index is a measure of the reaction rate. Our process also results in the formation of substantially one liquid phase since the methanol vehicle readily dissolves in the olefin feed and/or reaction medium; thus, the finely divided cobalt salt particles are readily available for conversion to the active cobalt carbonyl and/or hydrocarbonyl catalyst. On the other hand, an oil-insoluble cobalt salt such as cobalt acetate which is dissolved in an aqueous medium prior to injection suffers from the disadvantage that two liquid phases are present in the hydroformylation zone whereby the potential catalyst dissolved in the aqueous medium is not readily available for conversion to the active catalyst form. Furthermore, our methanol solution containing potential catalyst does not require the use of emulsifying agents or components which might cause corrosion of the reaction system.

Several additional and unexpected advantages accrue by introducing into the hydroformylation zone, as the sole catalyst source, a methanol solution containing cobalt acetate or cobalt propionate as the potential catalyst source. These advantages are readily apparent from a consideration of Table I below.

TABLE I

*Utilization of cobalt salt-alcohol solution in the hydroformylation of olefins*

| Olefin | Cobalt Salt | Lb. of Co Salt Per 100 Lbs. of Olefin [1] | Pounds of Saturated Alcohol Solution Containing Cobalt Salt Per 100 Pounds of Olefin | | | |
|---|---|---|---|---|---|---|
| | | | Methanol | Ethanol | 1-Propanol | 1-Butanol |
| ethylene | cobalt acetate | 0.8 | 9 | 81 | 2,000 | 1,000 |
| Do | cobalt formate | 0.8 | 102 | 2,025 | 2,000 | 4,000 |
| Do | cobalt propionate | 1.0 | 4 | 17 | 33 | 33 |
| propylene | cobalt acetate | 0.8 | 9 | 81 | 2,000 | 1,000 |
| Do | cobalt formate | 0.8 | 102 | 2,025 | 2,000 | 4,000 |
| Do | cobalt propionate | 1.0 | 4 | 17 | 33 | 33 |
| nonene | cobalt acetate | 0.8 | 9 | 81 | 2,000 | 1,000 |
| Do | cobalt formate | 0.8 | 102 | 2,025 | 2,000 | 4,000 |
| Do | cobalt propionate | 1.0 | 4 | 17 | 33 | 33 |

[1] This vertical row designates the actual weight of the cobalt salt per se contained in a saturated alcohol solution. The last four vertical rows reveal the number of pounds of the saturated alcohol solution in question which are required to give the above-said actual weight of the cobalt salt in question.

In Table I supra, sufficient cobalt salt, i.e., cobalt formate, cobalt acetate, and cobalt propionate, were dissolved in various alcoholic vehicles, i.e. methanol, ethanol, 1-propanol, and 1-butanol, to give a saturated alcohol solution of the cobalt salt. For convenience, the unit weight of olefin which is subjected to the hydroformylation reaction is designated as 100 pounds. The amount of cobalt acetate and cobalt propionate necessary to effect the hydroformylation of 100 pounds of the olefin in question is 0.8 and 1.0 pound, respectively. It was observed that under actual plant conditions these weight ratios of the above-said cobalt salts to olefin were considered to give approximately optimum results. The weight of cobalt propionate (1.0 pound/100 pounds of olefin) employed was greater than the weight of cobalt acetate (0.8 pound/100 pounds of olefin) employed in these runs. This approach was followed since the cobalt metal content available for conversion to active catalyst, i.e., cobalt cabonyl and/or hydrocarbonyl, from 1.0 pound of cobalt propionate and 0.8 pound of cobalt acetate is approximately equal, and consequently, true comparative results were established. Referring to the last four vertical columns in Table I, it is seen that in order to obtain 0.8 pound or 1.0 pound of cobalt salt per 100 pounds of olefin a definite weight of the saturated alcohol solution is necessary. For cobalt acetate and cobalt propionate dissolved in methanol (saturated) there was needed 9 pounds and 4 pounds of saturated methanol solution, respectively, per 100 pounds of olefin. When cobalt acetate or cobalt propionate was dissolved in ethanol, 1-propanol, or 1-butanol, the weight of saturated alcohol solution necessary to give 0.8 pound and 1.0 pound of cobalt salt (per 100 pounds of olefin) increased approximately two-fold to several hundred-fold.

It is apparent from the preceding discussion that the practice of our invention results in several unexpected and useful advantages. A far less amount of methanol is employed to obtain optimum hydroformylation conditions than is the case when one uses ethanol, 1-propanol, and 1-butanol. Cost-wise, methanol is the least expensive of these alcohols. In addition, alcohols present during the hydroformylation reaction tend to undergo formation to acetals; consequently, the amount of acetal formation is less when methanol is employed than is the when ethanol, 1-propanol, and 1-butanol are employed. A most important advantage resulting from the practice of our invention is that a fixed hydroformylation unit, capacity-wise, can process greater amounts of olefin per unit of time than would be possible if the 2 to 4 carbon alcohol were employed as the vehicle for the dissolved cobalt salt. Expressed differently, the effective capacity of the hydroformylation unit decreases as the quantity of alcohol vehicle increases. Consequently, the use of ethanol, 1-propanol, and 1-butanol, as the alcohol vehicle would occupy a greater volume within the hydroformylation reactor (to the detriment of the olefin desired to be processed) than is the case when one employs methanol as the vehicle. Another advantage is to be found in the recovery of the organic vehicle from the reaction product. It is obvious from the above discussion that the recovery problem is minimized since far less methanol is used to obtain optimum conditions.

Amenable to the reaction are straight and branch chained olefinic compounds, depending on the type of oxygenated compounds desired. Not only olefins, but most organic compounds possessing at least one non-aromatic, carbon-carbon double bond in which the cobalt salt is in soluble therein may be reacted by this method. The olefinic compounds contemplated in our invention include, among others monoolefins, diolefins, aryl substituted olefins, cycloolefins, and the like. Mixtures of olefins and hydrocarbons fractions containing appreciable quantitities of olefin may be used as starting material, depending upon the nature of the final product desired. The invention is particularly suitable to olefins containing 2 to 15 carbon atoms per molecule such as butene, hexene, nonene, dodecene, and the like.

The ratio of hydrogen to carbon monoxide, i.e. synthesis gas, fed to the hydroformylation zone is not narrowly critical. Generaly, the molar ratio of hydrogen to carbon monoxide is within the limits from about 1 to 3 moles of hydrogen per mole of carbon monoxide; however, ratios outside of this range can be employed. Preferred results are obtained when the mole ratio of hydrogen to carbon monoxide is approximately 1:1. Generally, the ratio of synthesis gas, i.e. one mole of synthesis gas equals one mole of Co plus one mole of $H_2$, to olefins is at least 1:1 or higher on a molar basis. Suitable results are obtained when the ratio of the synthesis gas to olefin is 1:1 to 3:1 on a molar basis, and preferably at a ratio of approximately 1.5:1 on a molar basis.

The conditions for reacting olefins with the synthesis gases can be varied in accordance with the nature of the olefin feed. In general, the hydroformylation reaction is conducted at a temperature in the range from about 100° to about 500° C. under superatmospheric pressures in the range from about 2,000 to about 10,000 p.s.i.g. and preferably from about 100° to 250° C. temperature range and from about 3000 to about 6000 p.s.i.g. pressure range. In a continuous process the inlet space velocity will be dependent on the olefin. For example, the liquid space velocity for nonene is generally from about 1.0 to 5.0 hour$^{-1}$, and preferably from about 1.5 to about 2.0 hour$^{-1}$. On the other hand the gaseous space velocity for ethylene is preferably from about 100 to 500 hour$^{-1}$.

Whether operating a batch or continuous process the weight percent of cobalt salt, i.e., cobalt acetate or cobalt propionate, based on the weight of the olefin feed, is generally kept within defined limits of concentration for optimum results. A suitable weight percent range of these cobalt salts to olefin is fron about 0.1 to 5.0, and preferably from about 0.4 to 1.0. The amount of methanol to olefin can vary from about 1 to 15 weight percent of the alcohol based on the olefin, and preferably from about 2 to 12 weight percent. For example, injection into the hydroformylation zone of from about 0.05 to about 0.12 pounds of a saturated solution of cobalt acetate in methanol (up to 8.5 weight percent of cobalt acetate will dissolve in methanol) per pound of olefin is a particularly ratio.

The crude hydroformylation mixture can be treated in any conventional manner to recover the oxygenated products, e.g., alcohols and aldehydes, such as separation by distillation. The aldehyde portion in the aldehyde-alcohol containing mixture can be subsequently hydrogenated in the presence of a hydrogenation catalyst to form the corresponding alcohol or can be oxidized by air or oxygen to form an acid-alcohol mixture which is subsequently refined.

One particularly suitable method of refining the crude hydroformylation mixture comprising alcohol and aldehyde and dissolved cobalt compounds is by a sequence of steps wherein the hydroformylation crude is first decobalted with an aqueous solution of sulfuric acid to form an organic phase comprising aldehydes and alcohols which is substantially free of dissolved cobalt compounds, and an aqueous phase containing cobalt sulfate, subsequently separating said aqueous and organic phases, followed by contacting said organic phase with water at elevated temperature and pressures, separating, by distillation, an aldehyde-alcohol fraction and, if desired, hydrogenating the aldehyde in said aldehyde-alcohol fraction to the corresponding alcohol. Alternatively, the aldehyde portion in said aldehyde-alcohol fraction can be oxidized to the corresponding carboxylic acid by the use of air or molecular oxygen with or without the aid of a catalyst, or, if desired the aldehyde portion can be oxidized by the use of other suitable oxidizing agents such as potassium permanganate, nitric acid, copper salts, ammoniacal silver nitrate and other compounds well recognized to the art.

In the refining of the hydroformylation crude product, the amount of aqueous sulfuric acid employed in the decobalting step is not narrowly critical. In general, the crude product is treated with about 1 to 15 weight percent of aqueous sulfuric acid, preferably from about 5 to about 10 weight percent. At the preferred acid concentration from about one-quarter volume to about one volume of the aqueous acid solution to crude is sufficient to convert substantially all of the cobalt compounds contained therein into an water-soluble cobalt salt. A temperature of at least about 25° C. under atmospheric pressure is suitable.

The organic phase resulting from the decobalting step is subsequently treated in the so-called pressure hydrolysis step which comprises contacting said organic phase with water at a temperature in the range from about 150° to about 300° C. under a pressure from about 250 to about 1500 p.s.i.g., and preferably from 200° to 300° C. at autogenous pressures, for a period of time sufficient to effect hydrolysis of acetals and condensation products which can be from a few seconds to several hours. The amount of water necessary is not narrowly critical and beneficial results can be obtained by the employment of quantities at least stoichiometrically equivalent to the hydrolyzable components, such acetals. In general, it is preferred to employ an amount from about 5 volume percent to about 50 volume percent of water based on the volume of organic phase charged during the pressure hydrolysis step.

The pressure hydrolysis step is amenable to both batch and continuous operation. In a batch process the pressure hydrolysis is essentially complete shortly after an operative temperature has been reached. In a continuous operation the reaction is essentially complete after a contact time varying from several seconds to several hours or, in general, at inlet space velocities of the organic phase (from the decobalting step) in the range from about 0.5 to about 200 hour$^{-1}$, preferably from about 0.75 to about 11.0 hour$^{-1}$.

The following examples are illustrative:

EXAMPLE I

Comparative runs were conducted using cobalt acetate dissolved in methanol, and cobalt acetate slurried in nonene as the potential catalyst source in the hydroformylation of nonene with hydrogen and carbon monoxide. The time required for the pressure to drop from the initial value of 3000 p.s.i.g. to 2000 p.s.i.g. was used as a measure of the reaction rate, i.e., the reaction rate index.

A. Five grams of cobalt acetate slurried in nonene was charged to a rocker bomb. The total nonene charge was 1000 grams. The rocker bomb was pressured cold to 500 p.s.i.g. with equal volume of carbon monoxide and hydrogen, followed by heating to 180° C. at which temperature the pressure rose to 825 p.s.i.g. The pressure was further increased to 3000 p.s.i.g. with equal volumes of carbon monoxide and hydrogen in 25 seconds. The time required for the pressure to drop from 3000 to 2000 p.s.i.g. at 198° C. was approximately 10 minutes.

B. Five grams of cobalt acetate dissolved in 54 grams of methanol was charged to the rocker bomb noted in A. The total nonene charge was 1000 grams. The rocker bomb was pressured cold to 500 p.s.i.g. with equal volumes of carbon monoxide and hydrogen, followed by heating to 180° C. at which temperature the pressure rose to 825 p.s.i.g. The pressure was further increased to 3000 p.s.i.g. with equal volumes of carbon monoxide and hydrogen in 25 seconds. The time required for the pressure to drop from 3000 to 2000 p.s.i.g. at 195° C. was approximately five minutes.

The above data clearly indicates the advantage of dissolving cobalt acetate in methanol as compared with slurrying cobalt acetate in nonene as is evidenced by the decreased reaction rate index with the use of the former.

EXAMPLE II

Nine parts by volume of nonene and one part by volume of a saturated solution of cobalt acetate in methanol (8.5 weight percent of cobalt acetate) were charged to a small flask at room temperature and the contents agitated. A finely divided dispersion was immediately evident; upon standing, the precipitate collected at the bottom of the flask. Analysis of the precipitate showed it to be cobalt acetate particles; examination under the light microscope disclosed an average particle size approaching colloidal dimensions.

EXAMPLE III

To determine the solubility of cobalt acetate at reaction temperature and pressure in an Oxo converter, the following runs were conducted. Separate slurries containing 2 percent by weight of cobalt acetate in (a) nonenes, (b) crude decanols (nonenes hydroformylation crude product) and (c) the crude decanols to which 8 percent by weight methanol had been added were pumped through an Oxo converter held at 215° C. and 6000 p.s.i.g. at a rate sufficient to give a residence time of 30 minutes. Filters, held at this same pressure and temperature, were placed at the converter outlet to retain all non-dissolved cobalt acetate within the converter. No carbon monoxide or hydrogen was admitted to the reactor during the runs because the synthesis gas would react to form oil-soluble cobalt carbonyl which would impair an interpretation of the results of the runs. The liquid effluent in each run was found by spectrometric analysis to be free of cobalt (method sensitivity, 0.01 percent cobalt). Large deposits of cobalt compounds were found in the converter.

Examples II and III show that by dissolving cobalt acetate in methanol and injecting the solution into the reaction zone with the olefin, at reaction temperature and pressure of hydroformylation, the methanol dissolves in the reaction mixture while throwing out, i.e., precipitating, the cobalt acetate in finely divided form.

EXAMPLE IV

A solution containing 6.5 weight percent cobalt acetate in methanol was injected along with the nonene feed stream into a hydroformylation reactor to give a final concentration of cobalt acetate of 0.75 weight percent in the reaction zone. Based on actual catalyst and olefin feed rates the methanol concentration was equal to 11.5 weight percent of the olefin feed to the converter. Hydroformylation of the olefin was carried out at a pressure of 6000 p.s.i.g. a temperature of 200° C., and an inlet olefin space velocity of 1.5 hour$^{-1}$. The crude hydroformylation product was decobalted by refluxing for one hour with one-quarter volume of a 5 percent by weight of aqueous sulfuric acid solution and the organic layer washed with one-half volume of water. The decobalted crude product was then mixed with a one-third volume of water and heated in a rocker bomb to a temperature of 250° C. at autogenous pressure for a period of one-half hour. After the reaction was complete the crude product was discharged from the bomb and the aqueous and organic layers separated. Upon subsequent disillation of the organic layer recovered there was provided 68.8 percent by weight of a $C_{10}$ aldehyde-alcohol fraction boiling over a temperature range of 45° C. to 115° C. at 10 mm. Hg. absolute and having a purity of 95 weight percent as a mixture of decanals and decanols which represents a yield of 65.4 percent by weight based upon the crude hydroformylation product charge to the reactor.

EXAMPLE V

A sample of nonenes was reacted with carbon monoxide and hydrogen at a pressure of 5,800 p.s.i.g. and an inlet space velocity of 1.64 hour$^{-1}$. A solution of 8.5 weight percent cobalt acetate, dissolved in methanol, and nonenes were fed into a hydroformylation reactor at rates sufficient to give a ratio of cobalt acetate to nonene of 0.0085 on a weight basis. The ratio of hydrogen to carbon monoxide was 1.20:1 on a molar basis, while the ratio of synthesis gas to olefin was 1.85:1.54 on a molar basis. The hydroformylation was carried out at a temperature of 205° C. The crude product was decobalted and pressure hydrolyzed as described in Example IV. Upon distillation of the organic layer recovered there was provided 66.9 percent by weight of a $C_{10}$ aldehyde-alcohol fraction boiling over a temperature range of 45° C.

to 115° C. at 10 mm. of Hg absolute and having a purity of 95 weight percent as a mixture of decanals and decanols which represents a yield of 63.6 percent by weight based upon the crude hydroformylation product charged to the reactor.

EXAMPLE VI

A sample of tetrapropylene was reacted with carbon monoxide and hydrogen at a temperature of 205° C. and a pressure of 6,000 p.s.i.g. A solution of 8.5 weight percent cobalt acetate, dissolved in methanol, was injected into the reaction zone to give a final concentration of cobalt acetate in the reaction zone of 1.00 percent by weight based on tetrapropylene. The inlet liquid space velocity of tetrapropylene was 1.00 hour$^{-1}$. The crude product was decobalted and hydrolyzed by charging said crude to a rocker bomb with a 1/6 volume of water and heated to a temperature of 250° C. at autogenous pressure for one-half hour. After the reaction was complete the crude product was discharged from the bomb and the aqueous and organic layer separated. Upon subsequent distillation of the organic layer there was obtained 57.8 percent by weight of a $C_{13}$ aldehyde-alcohol fraction boiling over a temperature range of 95 to 155° C. at 10 mm. Hg absolute and having a purity of 98 percent which represents a yield of 56.5 percent by weight based upon the crude hydroformylation product.

EXAMPLE VII

Ethylene was reacted with carbon monoxide and hydrogen at 3000 p.s.i.g. and at a temperature of 175° C. in the presenec of 0.4 weight percent cobalt acetate, based on ethylene, introduced as an 8.5 weight percent solution in methanol. The inlet gaseous space velocity of the ethylene feed was 260 hour$^{-1}$. The hydroformylation crude product was decobalted and refined by refluxing in the presence of 15 percent by volume of 6 weight percent sulfuric acid. Upon subsequent steam distillation there was obtained propionaldehyde which represented 66.5 percent by weight of the charge, and which represented a yield of 65.4 percent (on a mol basis) based upon the ethylene charged to the reactor.

Various modifications and embodiments of our invention can be made without departing from the spirit and scope thereof.

What is claimed is:

1. A one-step hydroformylation process for preparing oxygen-containing compounds which contain at least one more carbon atom than the olefinic hydrocarbon reagent which comprises introducing, as the sole catalyst source, a potential oil-insoluble cobalt salt catalyst selected from the group consisting of cobalt acetate and cobalt propionate, said cobalt salt being dissolved in methanol, into a hydroformylation reaction zone containing an olefinic hydrocarbon, carbon monoxide and hydrogen, said hydroformylation zone being maintained under hydroformylation reaction conditions to thus produce in situ said cobalt salt finely dispersed in liquid reaction medium, and recovering from said hydroformylation zone oxygen-containing products.

2. The process of claim 1 wherein said cobalt salt is cobalt acetate.

3. The process of claim 1 wherein said cobalt salt is cobalt propionate.

References Cited in the file of this patent

UNITED STATES PATENTS

| | | |
|---|---|---|
| 2,691,046 | Hasek | Oct. 5, 1954 |
| 2,748,167 | Hagemeyer | May 29, 1956 |

UNITED STATES PATENT OFFICE

CERTIFICATE OF CORRECTION

Patent No. 2,919,292                December 29, 1959

Philip C. Johnson et al.

It is hereby certified that error appears in the printed specification of the above numbered patent requiring correction and that the said Letters Patent should read as corrected below.

Column 4, line 19, for "300 p.s.i.g.," read -- 3000 p.s.i.g., --; line 21, for "200 p.s.i.g.;" read -- 2000 p.s.i.g.; --; column 5, line 69, for "Generaly" read -- Generally --; column 6, line 25, for "fron" read --from--; column 6, line 33, after "particularly" insert -- suitable --.

Signed and sealed this 5th day of July 1960.

(SEAL)
Attest:

KARL H. AXLINE
Attesting Officer

ROBERT C. WATSON
Commissioner of Patents